United States Patent
Okajima et al.

(10) Patent No.: US 10,893,505 B2
(45) Date of Patent: *Jan. 12, 2021

(54) ENHANCED PAGER NETWORK

(71) Applicant: Statum Systems Inc., Wellesley, MA (US)

(72) Inventors: Stephen Michael Okajima, Boston, MA (US); Arman Serebrakian, Boston, MA (US); Ara Nazarian, Wellesley, MA (US)

(73) Assignee: Statum Systems Inc., Wellesley, MA (US)

( * ) Notice: Subject to any disclaimer, the term of this patent is extended or adjusted under 35 U.S.C. 154(b) by 122 days.

This patent is subject to a terminal disclaimer.

(21) Appl. No.: 15/877,986

(22) Filed: Jan. 23, 2018

(65) Prior Publication Data

US 2019/0230622 A1    Jul. 25, 2019

(51) Int. Cl.
*H04W 68/00* (2009.01)
*H04W 68/02* (2009.01)
*H04W 4/80* (2018.01)

(52) U.S. Cl.
CPC .............. *H04W 68/02* (2013.01); *H04W 4/80* (2018.02)

(58) Field of Classification Search
CPC ..... H04W 12/12; H04W 12/06; H04W 68/00; H04W 84/022; H04W 4/14
USPC .......................... 455/410–411, 458–459, 466
See application file for complete search history.

(56) References Cited

U.S. PATENT DOCUMENTS

| | | | |
|---|---|---|---|
| 5,032,825 A | 7/1991 | Kuznicki | |
| 5,664,013 A | 9/1997 | Rossi | |
| 5,978,837 A * | 11/1999 | Foladare | H04L 51/14 340/5.74 |
| 7,093,137 B1 | 8/2006 | Sato et al. | |
| 2002/0173319 A1 | 11/2002 | Fostick | |
| 2005/0170869 A1* | 8/2005 | Slemmer | B60R 11/0241 455/575.1 |
| 2006/0112339 A1 | 5/2006 | Struthers et al. | |
| 2009/0287920 A1 | 11/2009 | Fernandez et al. | |
| 2010/0305966 A1* | 12/2010 | Coulter | G06Q 10/04 705/2 |
| 2011/0154040 A1 | 6/2011 | Bheemanna | |
| 2012/0004961 A1* | 1/2012 | Flynn | G06Q 30/02 705/14.5 |

(Continued)

FOREIGN PATENT DOCUMENTS

WO    2020018198    1/2020

OTHER PUBLICATIONS

"International Application Serial No. PCT/US2019/036512, International Search Report dated Aug. 23, 2019", 2 pgs.

(Continued)

*Primary Examiner* — Matthew W Genack
(74) *Attorney, Agent, or Firm* — Schwegman Lundberg & Woessner, P.A.

(57) ABSTRACT

Example embodiments involve an enhanced paging system, executed through novel hardware components, to facilitate a client device to pass incoming messages off, through Wi-Fi or cellular data, to a central server. This central server handles a response request, and sends the message to a corresponding pager address found within a pager network, allowing a closed loop two-way communication handled through a graphical user interface which may be displayed at the client device.

20 Claims, 8 Drawing Sheets

(56) References Cited

U.S. PATENT DOCUMENTS

| | | |
|---|---|---|
| 2012/0171960 A1 | 7/2012 | Oshinsky et al. |
| 2013/0259028 A1* | 10/2013 | Skala .................. G06Q 10/107 370/352 |
| 2013/0318347 A1 | 11/2013 | Moffat |
| 2014/0229737 A1 | 8/2014 | Roth et al. |
| 2014/0229739 A1 | 8/2014 | Roth et al. |
| 2014/0325217 A1 | 10/2014 | Mori et al. |
| 2015/0172881 A1* | 6/2015 | Huang .................. H04W 4/14 455/466 |
| 2015/0181171 A1* | 6/2015 | Park ........................ H04N 7/18 348/143 |
| 2015/0248357 A1 | 9/2015 | Kaplan et al. |
| 2016/0007271 A1* | 1/2016 | Plicanic Samuelsson ................... H04W 48/14 455/426.1 |
| 2016/0057156 A1 | 2/2016 | Lin et al. |
| 2016/0234201 A1 | 8/2016 | Sirota |
| 2017/0344646 A1 | 11/2017 | Antonopoulos et al. |
| 2018/0048464 A1 | 2/2018 | Lim et al. |
| 2018/0205715 A1* | 7/2018 | Ingale .................. H04L 63/062 |
| 2019/0182216 A1 | 6/2019 | Gulak et al. |
| 2019/0230623 A1 | 7/2019 | Okajima et al. |
| 2019/0237170 A1 | 8/2019 | Okajima et al. |

OTHER PUBLICATIONS

"International Application Serial No. PCT/US2019/036512, Written Opinion dated Aug. 23, 2019", 9 pgs.

"U.S. Appl. No. 16/040,081, Non Final Office Action dated Feb. 20, 2020", 52 pgs.

"U.S. Appl. No. 16/040,081, Final Office Action dated Jul. 22, 2020", 54 pgs.

"U.S. Appl. No. 16/040,081, Response filed Jun. 22, 2020 to Non Final Office Action dated Feb. 20, 2020", 12 pgs.

"U.S. Appl. No. 16/040,081, Response filed Oct. 21, 2020 to Final Office Action dated Jul. 22, 2020", 14 pgs.

"U.S. Appl. No. 16/377,564, Non Final Office Action dated Nov. 10, 2020", 7 pgs.

* cited by examiner

ENHANCED PAGER NETWORK

TECHNICAL FIELD

The present invention relates to a portable electronic device for storage and transfer of digital data.

BACKGROUND

Current paging technology is cumbersome and out of date, forcing restrictions with accessibility and utility on its users. Pagers generally include receiving circuitry to receive a signal from a remote transmitting station and respond with an audio or visual notifications to notify a user of the page. To satisfy the paging function, pagers differ from telephone equipment in that pagers do not include transmission capabilities, but only receiver capabilities. Pagers do not support real time, two-way communication.

Presently, a majority of hospitals utilize pagers as a means of communication between healthcare providers due to the low cost, battery life, and robust network architecture. Despite these benefits, pagers still come with significant drawbacks and limitations as a result of the limited of two-way communication, and limited display capabilities.

BRIEF DESCRIPTION OF THE DRAWINGS

Some embodiments are illustrated by way of example and not limitation in the figures of the accompanying drawings in which.

DETAILED DESCRIPTION

Figure 1:
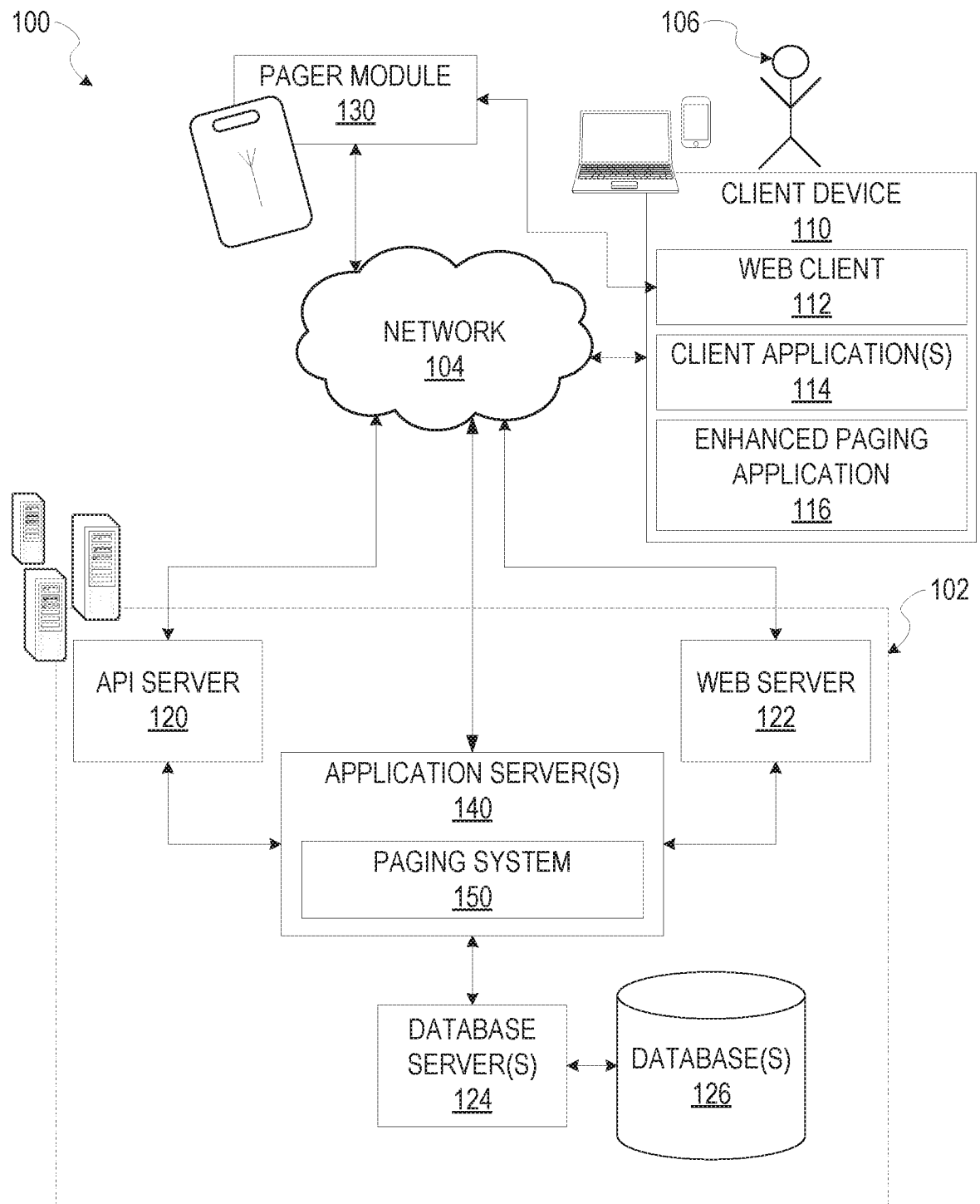
FIG. 1 is a network diagram depicting a client-server system, within which one example embodiment may be deployed.

Reference will now be made in detail to specific example embodiments for carrying out the inventive subject matter. Embodiments may be practiced without some or all of these details. It will be understood that the forgoing disclosure is not intended to limit the scope of the claims to the described embodiments. On the contrary, it is intended to cover alternatives, modifications, and equivalents as may be included within the scope of the disclosure as defined by the appended claims. In addition, well known features may not have been described in detail to avoid unnecessarily obscuring the subject matter.

As discussed above, current paging technology is cumbersome and out of date, forcing restrictions with accessibility and utility on its users. The proposed invention discloses example embodiments that comprise a specially configured pager module, modified with the addition of a low energy connectivity module (e.g., Bluetooth LE module (5.0)), and aims to tackle the inherent limitations of existing pagers by facilitating a link with current generation client devices such as smartphones, without necessitating any need for modifications upon existing, and already robust, pager network functionality.

In some example embodiments, a client device passes incoming messages off, through wi-fi or cellular data, to a central server. This central server handles a response request, and sends the message to a corresponding pager address found within a pager network, allowing a closed loop two-way communication handled through a graphical user interface which may be displayed at the client device. Such embodiments facilitate rapid communication through an existing pager network, while also allowing for a seamless fallback to the original pager system in the case of cellular/wi-fi network outages, such that messages remain accessible through the link between the client device and the pager module.

As a second benefit, such embodiments enable rich multimedia communication within an existing pager network. As each pager module may be associated with a specific address or device identifier (e.g., a capcode), which would be used to identify individuals or services tied to a specific client device. For instance, a client device may be set to receive a common capcode for emergency services, as well as the capcode specific to the user. This allows for both announcements and targeted information to be received by the client device. With each user specified by a unique capcode, these codes can be used as specific identifiers for a central server to communicate multi-media information back and forth between users on a network. This has many benefits: a user can make direct phone calls using information sent through the system, request VoIP, video over IP, recorded images, recorded messages, recorded video, or file transfer, without exposing a personal phone number. As this network may be connected to the internet, communications to existing services outside of the augmented pager network would also be possible while keeping the user's privacy tied to their unique network identifier.

Another benefit comes inherently from the improvements found in BTLE 5.0. Pairing and communications are extremely low energy, and do not tax the battery of the pager module itself. Introduced in BTLE 5.0 also exists the ability for extremely quick pairing to multiple devices. In this way, the multiple pager modules may be paired with a single device, or multiple devices may be paired to a single pager module. In some example embodiments, an application executing at the client device is configured to accept and parse the incoming messages for the user. In addition to this, the extended range of BTLE 5.0 allows for interesting possibilities, such as an intra-network of BT enabled pager module to communicate with client devices surrounding them (e.g., within a geo-fenced area). This could allow for emergency services to intelligently target users based off proximity and activity. Coupling this information with location services found on the client device, the server or other could use this information to assess current personnel availability.

According to certain example embodiments, a pager system transmits message data to a pager module based on attributes of the message data including an identifier of the pager module. The pager module identifies a client device in response to receiving the message data, and forwards the message data to the client device. The client device causes display of a notification in response to receiving the message data. In some example embodiments, the message data comprises message content which may include text, image, video, as well as location data identifying a location, and useable by a client device to navigate a user to a destination.

In some example embodiments, a pager module may be paired or otherwise associated with one or more client devices within a database. Messages received at the pager module may thereby be forwarded by various communication means (e.g., Bluetooth) to the one or more paired client devices. In further embodiments, the client device may respond to the messages forwarded by the pager module, and in response a central pager system may route and distribute the responses to the messages to recipient devices.

FIG. 1 is an example embodiment of a high-level client-server-based network architecture 100. A networked system 102, in the example form of a pager network, provides server-side functionality via a network 104 (e.g., the Internet or wide area network (WAN), Bluetooth) to one or more client devices 110, FIG. 1 illustrates, for example, a web client 112 (e.g., a browser, such as the Internet Explorer® browser developed by Microsoft® Corporation of Redmond, Wash. State), client application(s) 114, and an enhanced paging application 116 executing on the client device 110.

The client device 110 may comprise, but is not limited to, a wearable device, mobile phone, desktop computer, laptop, portable digital assistant (PDA), smart phone, tablet, ultrabook, netbook, laptop, multi-processor system, microprocessor-based or programmable consumer electronics, game console, set-top box, or any other communication device that a user may utilize to access the networked system 102. In some embodiments, the client device 110 comprises a display module (not shown) to display information (e.g., in the form of user interfaces). In further embodiments, the client device 110 comprises one or more of touch screens, accelerometers, gyroscopes, cameras, microphones, global positioning system (GPS) devices, and so forth. The client device 110 may be a device of a user configured to facilitate communication within the networked system 102. One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, a Wireless Mesh Network (WMN), or a combination of two or more such networks.

The client device 110 may include one or more client applications 114 (also referred to as "apps") such as, but not limited to, a web browser, messaging application, electronic mail (email) application, a navigation application, and the like. In some embodiments, the client application(s) 114 is configured to locally provide the user interface and at least some of the functionalities with the client application(s) 114 configured to communicate with the networked system 102, on an as needed basis, for data or processing capabilities not locally available (e.g., access to a database of items available for sale, to authenticate a user, to verify a method of payment). Conversely, the client device 110 may use its web browser to access data hosted on the networked system 102 to generate and provide various user interfaces.

One or more users 106 may be a person, a machine, or other means of interacting with the client device 110. In example embodiments, the user 106 is not part of the network architecture 100, but may interact with the network architecture 100 via the client device 110 or other means. For instance, the user 106 provides input (e.g., touch screen input, alphanumeric input, text-to-speech, or speech-to-text) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

An application program interface (API) server 120 and a web server 122 are coupled to, and provide programmatic and web interfaces respectively to, one or more application servers 140. The application server(s) 140 may host a paging system 150, which provides functionality operable to provide a means for managing links between one or more client device (e.g., client device 110), and a pager module 130, enabling a single device (e.g., the client device 110) to be utilized for both authentication and paging. For example, the paging system 150 distributes message data across the network 102 to a pager module 130. The pager module 130 identifies the client device 110 based on factors including attributes of the message data, and associations of pager identifiers and device identifiers located within the database(s) 126, and forwards the message data to the identified client device (e.g., client device 110). The enhanced paging application 116 causes display of a notification in response to receiving the message data at the client device 110.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The paging system 150 could also be implemented as standalone software programs, which do not necessarily have networking capabilities.

The web client 112 may access the various publication and payment systems 142 and 144 via the web interface supported by the web server 122. Similarly, the enhanced paging application 116 accesses the various services and functions provided by the paging system 150 via the programmatic interface provided by the API server 120. The enhanced paging application 116 may, for example, generate and cause display of notifications in response to receiving message data from an associated pager module 130.

Figure 2:
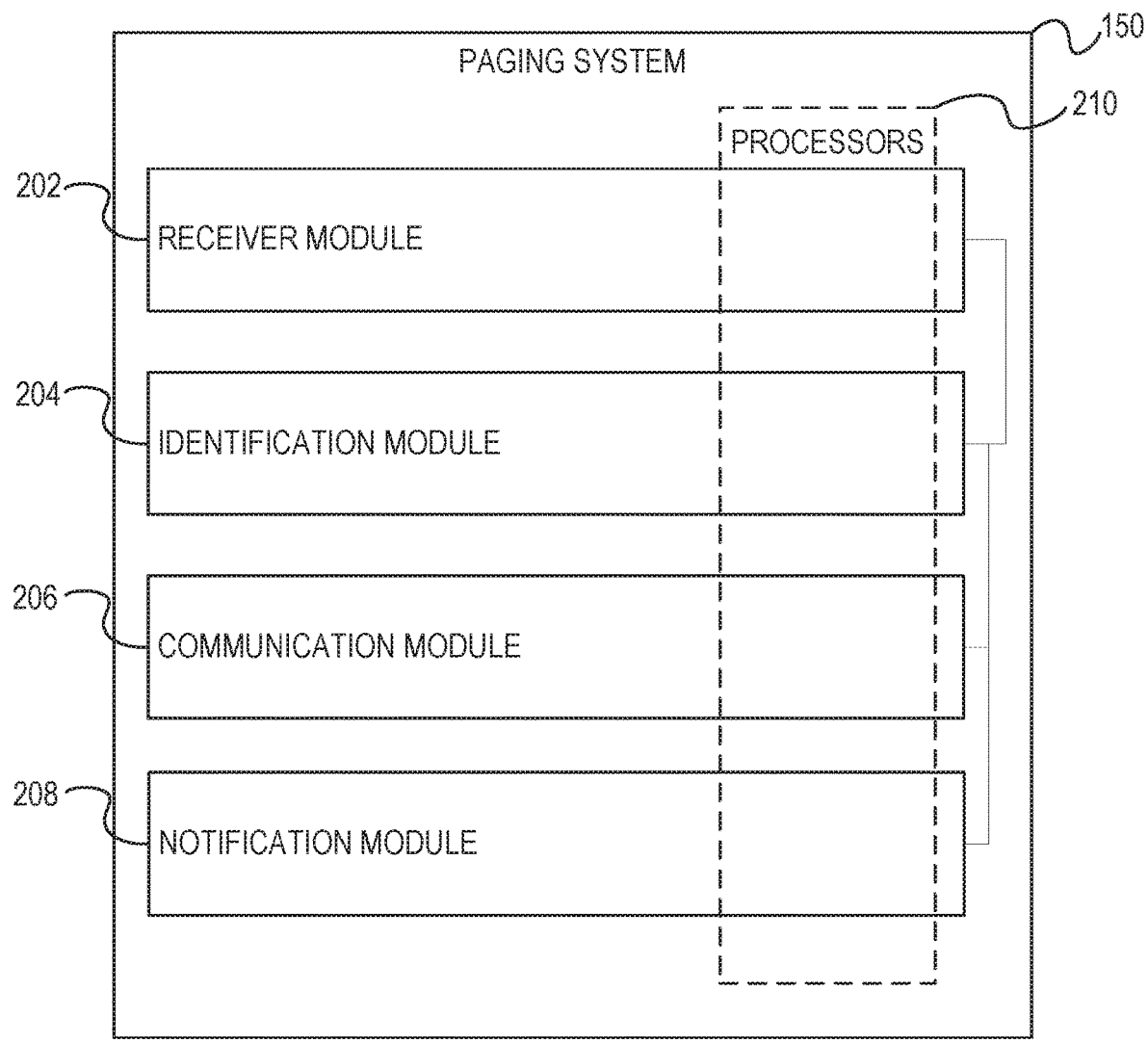
FIG. 2 is a block diagram illustrating components of a paging system, according to some example embodiments.

FIG. 2 is a block diagram illustrating components of the paging system 150 that configure the paging system 150 to distribute message data to a pager module 130, forward the message data from the pager module 130 to a client device 110, and cause display of a notification at the client device 110 in response to receiving the message data, according to some example embodiments. The paging system 150 is shown as including a receiver module 202, an identification module 204, a communication module 206, and a notification module 208, all configured to communicate with each other (e.g., via a bus, shared memory, or a switch). Any one or more of these modules 202-208 may be implemented using one or more processors 210 (e.g., by configuring such one or more processors 210 to perform functions described for that module) and hence may include one or more of the processors 210.

Any one or more of the modules 202-208 described may be implemented using hardware alone (e.g., one or more of the processors 210 of a machine) or a combination of hardware and software. For example, any module described of the paging system 150 may physically include an arrangement of one or more of the processors 210 (e.g., a subset of or among the one or more processors of the machine) configured to perform the operations described herein for that module. As another example, any module of the paging system 150 may include software, hardware, or both, that configure an arrangement of one or more processors 210 (e.g., among the one or more processors of the machine) to perform the operations described herein for that module. Accordingly, different modules of the paging system 150 may include and configure different arrangements of such processors 210 or a single arrangement of such processors 210 at different points in time. Moreover, any two or more modules of the paging system 150 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
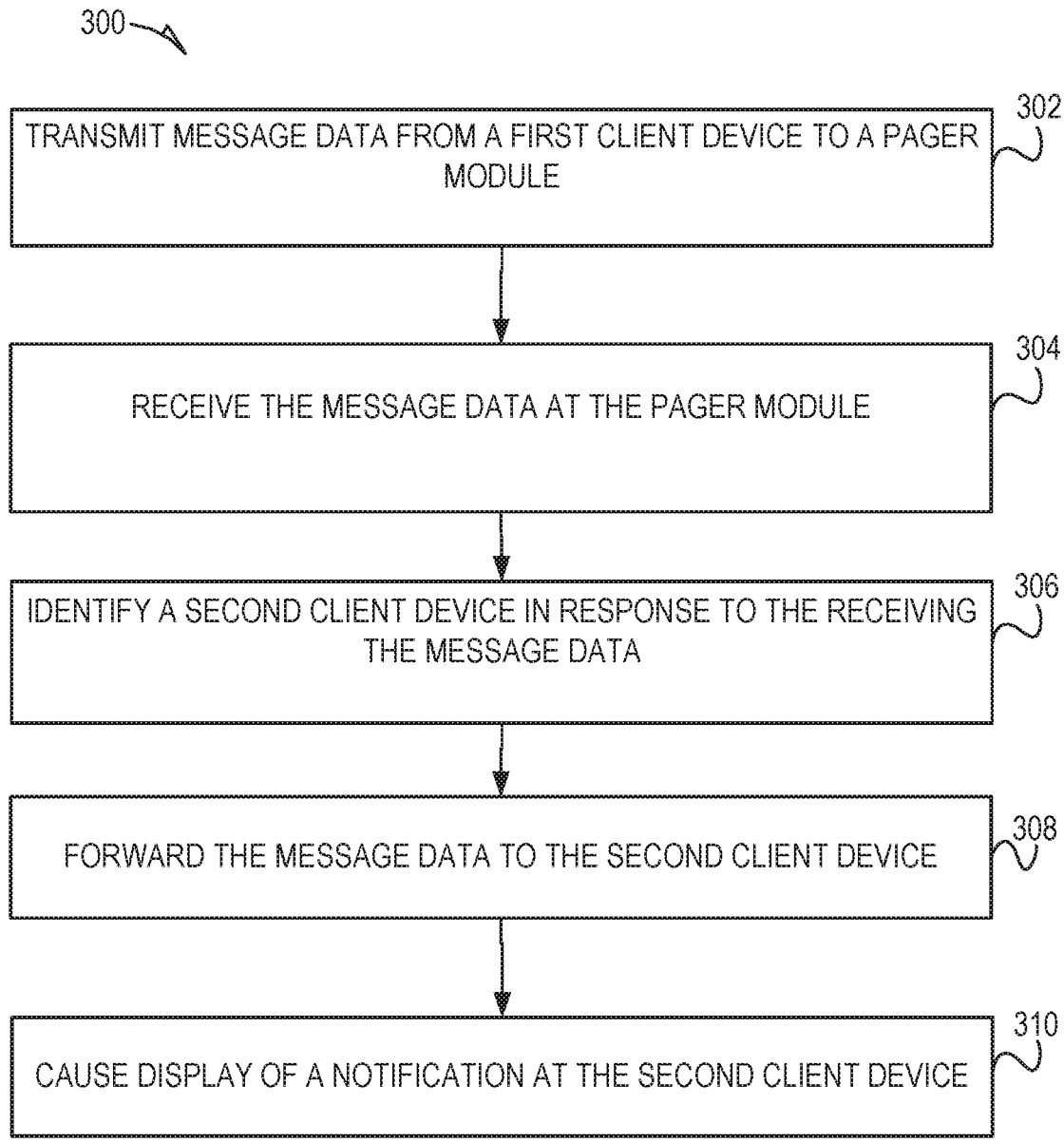
FIG. 3 is a flowchart illustrating operations of the paging system in forwarding message data to a client device, according to some example embodiments.

FIG. 3 is a flowchart illustrating operations of the paging system 150 in performing a method 300 of forwarding message data from a pager module 130 to a client device 110, according to some example embodiments.

In operation 302, the paging system 150 transmits message data received from a first client device to the pager module 130. The first client device may include the database server 124. The message data comprises at least message content, a device identifier, a user identifier, and a pager identifier. For example, a user may generate and send a page from a central system associated with the database server 124, wherein the page includes an identification of a specific pager, individual, or group identifier for a group of individuals.

In operation 304, a receiver module 202 associated with the pager module 130 receives the message data through the network 104. In some embodiments the network 104 may include a Simple Network Paging Protocol (SNPP), a Telelocator Alphanumeric Protocol (TAP), FLEX, reFLEX, Post Office Code Standardisation Advisory Group (POCSAG), GOLAY, Enhanced Radio Messaging System (FRMS), and NIT.

In operation 306, an identification module 204 identifies a second client device (e.g., the client device 110) to forward the message data, and provides the pager module 130 with an address of the identified client device. In some example embodiments, the pager module 130 may be paired or otherwise linked to the client device 110 via a wireless means including Bluetooth and Personal Area Networks (PANS). In further embodiments, a pager identifier associated with the pager module 130 may be linked with a device identifier or user identifier associated with the client device 110 within the database(s) 126.

In operation 308, a communication module 206 associated with the pager module 130 forwards the message data to the second client device (e.g., client device 110). In some example embodiments, the pager module 130 may communicate with the client device 110 via Bluetooth, or a PAN. In response to receiving the message data, at operation 310 a notification module 208 associated with the client device 110 generates and causes display of a notification that includes a presentation of the message data. For example, the presentation may include a display of message content of the message data, as well as an indication of a sender of the message data.

Figure 4:
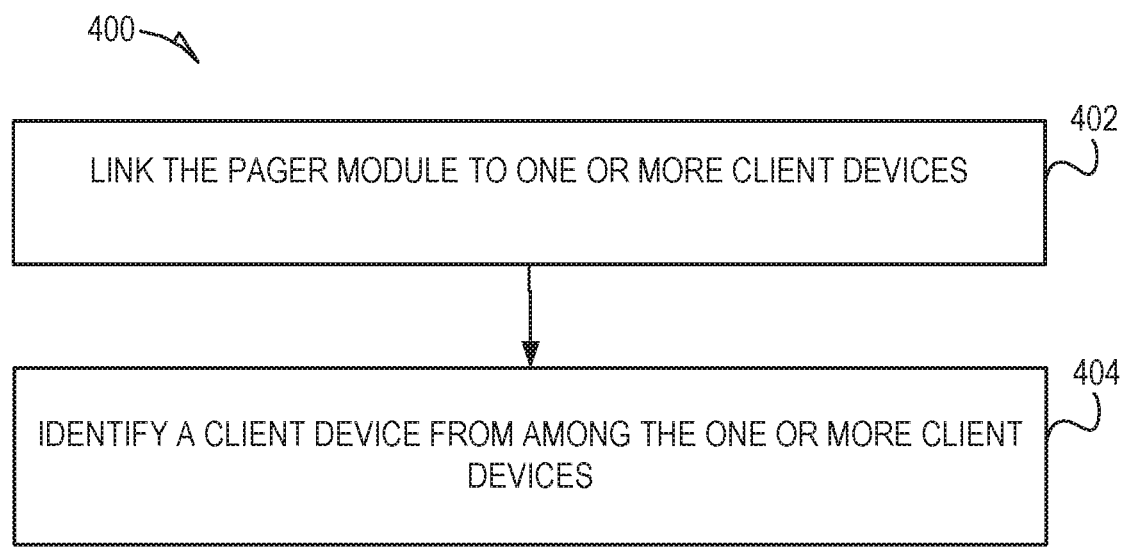
FIG. 4 is a flowchart illustrating operations of the paging system in forwarding message data to a client device, according to some example embodiments.

FIG. 4 is a flowchart illustrating operations of the paging system 150 in performing a method 400 of forwarding message data from a pager module 130 to a client device 110, according to some example embodiments. As shown in FIG. 4, one or more operations 402, and 404 may be performed as part (e.g., a precursor task, a subroutine, or a portion) of the method 300, according to some example embodiments.

In operation 402, the paging system 150 associated a pager identifier of the pager module 130 to one or more user identifiers or device identifiers associated with at least the client device 110 within the database(s) 126. For example, an administrator of the paging system 150 may provide inputs to specify a link between the pager module 130 and the client device 110. In further embodiments, in response to detecting a pairing of the pager module 130 to the client device 110, the paging system 150 updates the database(s) 126 to reflect the connection of the devices.

In operation 404, in response to receiving the message data at the pager module 130 at operation 304 of the method 300, the paging system 150 and/or the pager module 130 identifies the client device 110 from among one or more client devices, based on the information within the database(s) 126. In some example embodiments, the message data may include a device identifier or user identifier that identifies the client device 110.

Figure 5:
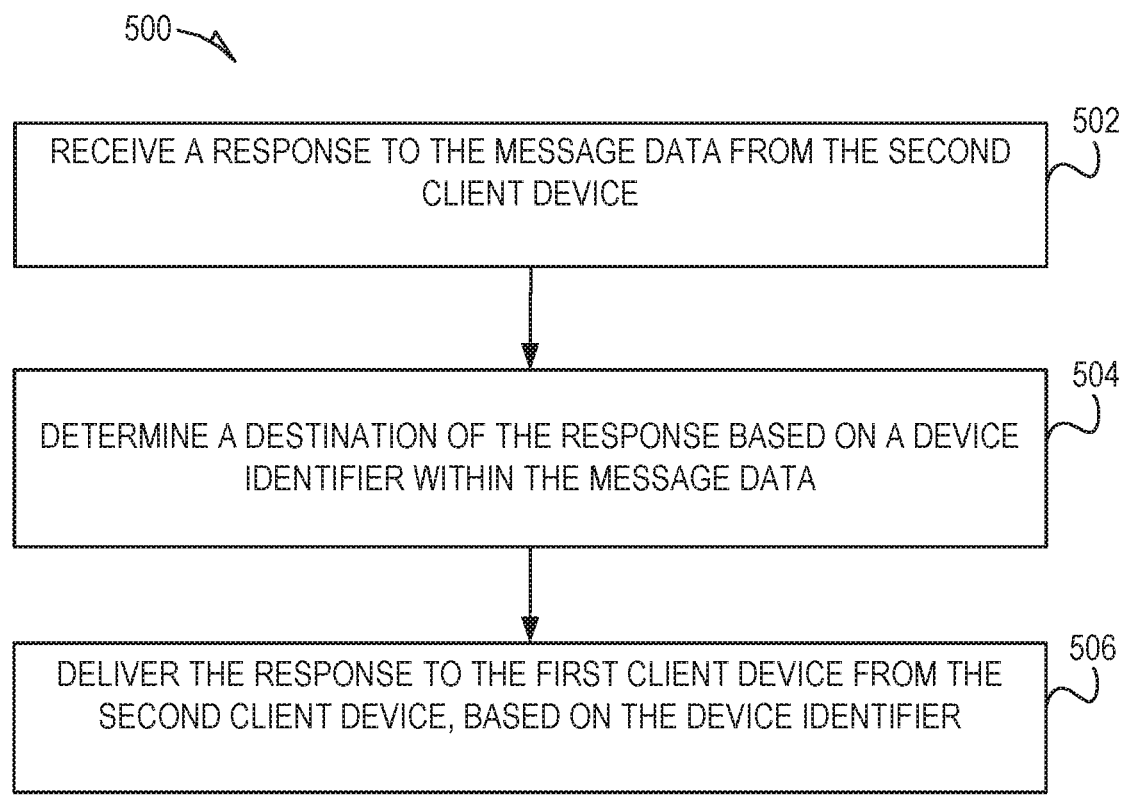
FIG. 5 is a flowchart illustrating operations of the paging system in delivering a response to message data, according to some example embodiments.

FIG. 5 is a flowchart illustrating operations of the paging system 150 in performing a method 500 of delivering a response to the message data, according to some example embodiments. As shown in FIG. 5, one or more operations 502, 504, and 506 may be performed as part (e.g., a precursor task, a subroutine, or a portion) of the method 300, according to some example embodiments.

In operation 502, the communication module 206 of the paging system 150 receives a response to the message data from the second client device (e.g., client device 110). The response to the message data may include message attributes that include a tag that identifies the message data, a pager identifier that identifies the pager module 130, and a device identifier that identifies the client device 110.

In operation 504, the paging system determines a destination for the response based on the message attributes, and at operation 506, the paging system 150 delivers the response to the destination (e.g., the first client device), via the network 104.

Figure 6:
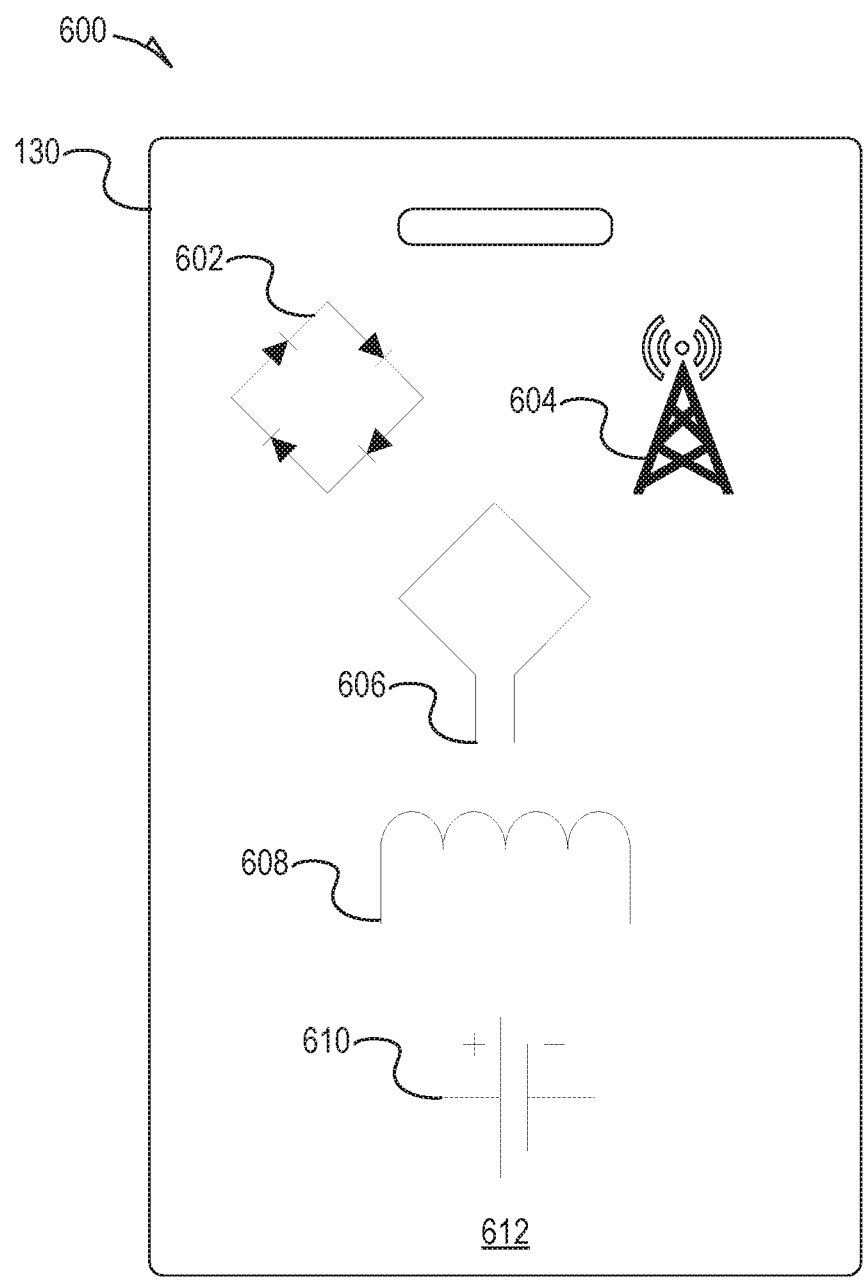
FIG. 6 is a diagram illustrating various functional components of a pager module, according to some example embodiments.

FIG. 6 is a diagram 600 illustrating various functional components of a pager module 130. As seen in the diagram 600, the pager module 130 may comprise a demodulator 602, a transmitter 604, an antenna 606, an inductive charging coil 608, and a battery 610, all enclosed within an enclosure 612.

In some example embodiments, the demodulator 602 includes a Frequency Shift Keying (FSK) Demodulator, configured to transmit digital information (e.g., message data) through discrete frequency changes of a carrier signal.

In some example embodiments, the transmitter 604 includes a short wave radio frequency transmitter (e.g., Bluetooth), configured to forward message data between the pager module 130 and a paired client device 110.

In some example embodiments the antenna 606 includes a loop antenna consisting of a loop of wire, and fully enclosed by the enclosure 612.

In some example embodiments, the charging coil 608 includes one or more exposed charging leads to enable a use to plug the pager module 130 into an outlet (e.g., USB).

In some example embodiments, the enclosure 612 is the fours of a proximity card, such as a contactless smart card.

Figure 7:
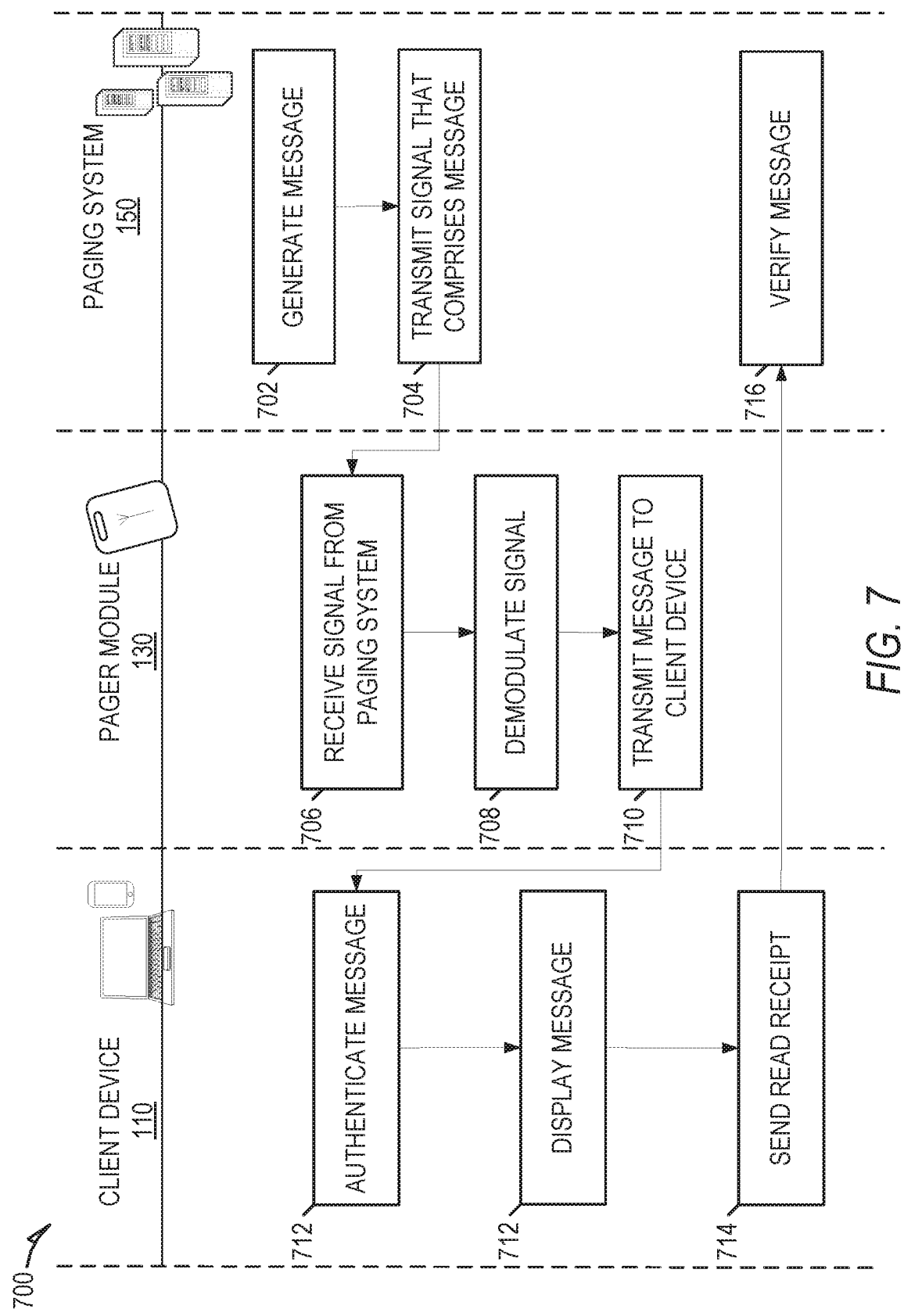
FIG. 7 is an interaction diagram illustrating a flow of data, according to some example embodiments.

FIG. 7 is an interaction diagram 700 illustrating a flow of data, and various interactions between the paging system 150, the pager module 130, and a client device 110, according to some example embodiments.

At operation 702, a first user of the paging system 150 generates a message to be distributed to a second user. The message may for example comprise message data (e.g., text data, multi-media content, audio data), as well as a recipient address (e.g., a pager address), and an identification of the paging system 150 (e.g., a device identifier, sender address, location data that identifies a location of the paging system 150). At operation 704, the paging system 150 transmits a signal that includes the message to the pager module 130, wherein the pager module 130 is identified by the pager address of the message. In some embodiments the signal is transmitted to the pager module 130 via a network, such as the network 104.

At operation 706, the pager module 130 receives the signal from the paging system 150. For example, the pager module 130 may receive the signal via the antenna 606, as depicted in FIG. 6. At operation 708, the demodulator 602 of the pager module 130, demodulates the signal received from the paging system 150, at the pager module 130. At operation 710, the demodulated signal is transmitted to a client device associated with the pager module 130 (e.g., client device 110). For example, the demodulated signal is transmitted to the client device 110 from the pager module 130 via a wireless communication medium, such as Wi-Fi, Bluetooth, or RF.

At operation 712, the client device 110 authenticates the signal based on the pager address indicated within the message. At operation 714, the client device 110 causes display of the message in response to the authentication.

In some embodiments, at operation 714, the client device 110 generates and transmits a read-receipt to the paging system 150, in response to causing display of the message. The read receipt may for example include a message identifier that identifies the message, the pager identifier associated with the client device 110, location data that identifies a location of the client device 110 at a time of receiving the message, and a time stamp that indicates a time in which the message was displayed at the client device. At operation 716, the paging system 150 receives the read receipt from the client device, and authenticates the read receipt based on attributes of the message. For example, the paging system 150 may authenticate the read receipt based on the message identifier, the pager identifier, or the location data.

In some embodiments, in response to verifying the message at the paging system 150, the paging system 150 may cause display of an indication that the message was received at the client device 110.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation, and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 8:
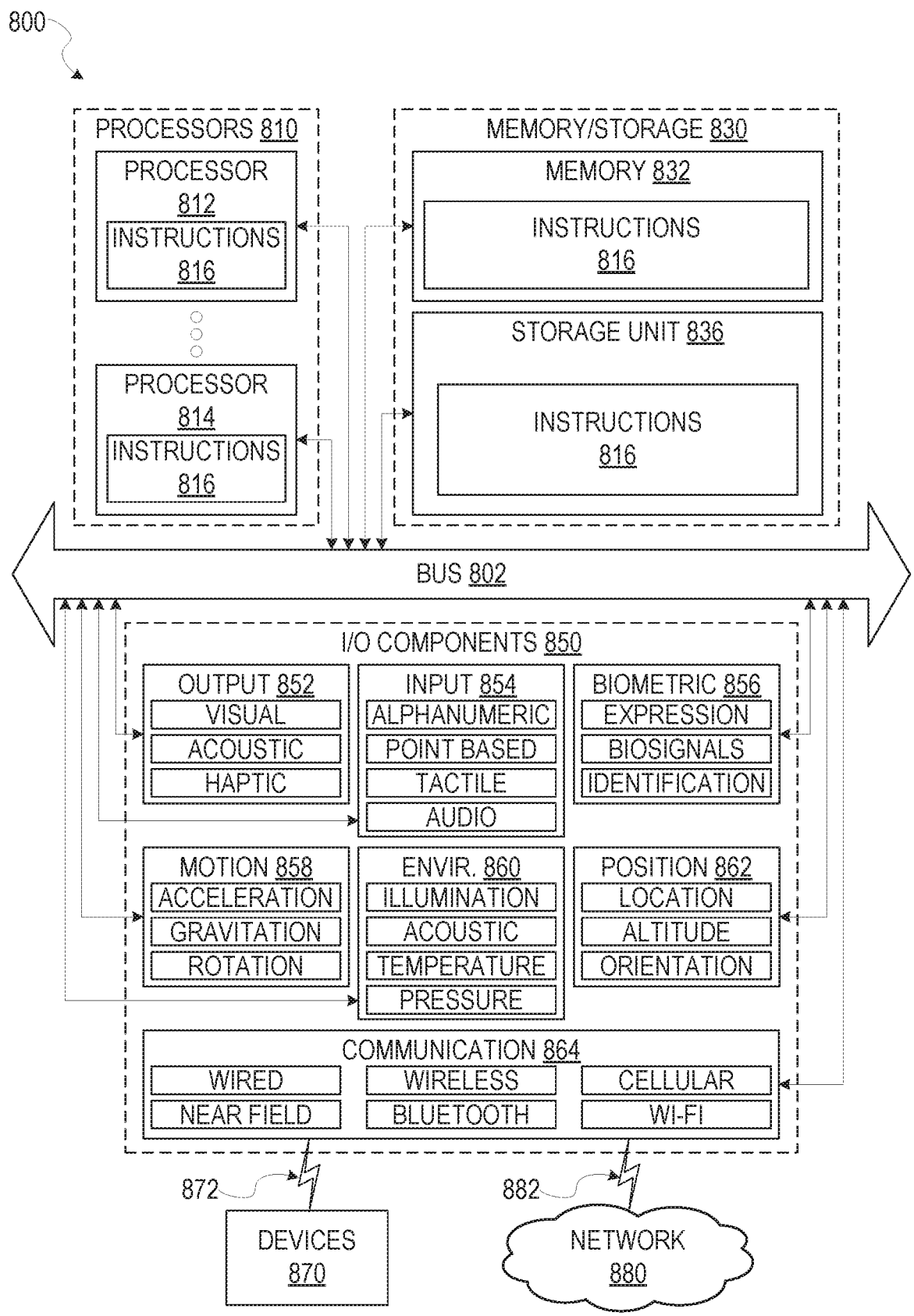
FIG. 8 is a diagrammatic representation of a machine in the example form of a computer system within which a set of instructions may be executed for causing the machine to perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. Additionally, or alternatively, the instructions may implement the modules of FIG. 2. The instructions transform the general, non-programmed machine into a specially configured machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment.

The machine 800 may comprise, but not be limited to, a server computer, a client computer, a personal computer IPC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (MC), another processor, or any suitable combination thereof) may include, for example, processor 812 and processor 814 that may execute instructions 816. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core process), multiple processors with a single core, multiple processors with multiples cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of processors 810 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes transitory signals per se, The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, organic light-emitting diode (OLED), a liquid crystal display (LCD), a projector, or a cathode ray tube (CRT)), electronic paper (e-paper), acoustic components (e.g., speakers), haptic components (e.g., a vibratory motor, resistance mechanisms other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components gyroscope), and so forth. The environmental components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872 respectively. For example, the communication components 864 may include a network interface component or other suitable device to interface with the network 880. In further examples, communication components 864 may include wired communication components, wireless communication components, cellular communication components, Near Field Communication (NEC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (REID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as, location via Internet Protocol (IP) geo-location, location via Wi-Fi® signal triangulation, location via detecting a NEC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (CPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LIE) standard, others defined by various standard setting organizations, other long range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to devices 870. The term "transmission medium" shall be taken to include any intangible medium that is capable of storing, encoding, or carrying instructions 816 for execution by the machine 800, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
one or more processors; and
a memory storing instructions that, when executed by at least one processor among the one or more processors, cause the system to perform operations comprising:
detecting a pairing of a pager module with a client device, the client device associated with a user identifier, and the pager module associated with a pager identifier;
updating a database to include a record of the pairing of the pager module with the client device, the record of the pairing including at least the pager identifier of the pager module and the user identifier of the client device;
receiving message data that includes at least message content, and the user identifier;
identifying the pager identifier of the pager module paired with the client device within the database based on the user identifier from the message data;
transmitting the message data to the pager module identified by the pager identifier;
causing the pager module to identify the client device communicatively coupled with the pager module based on the user identifier from the message data;
causing the pager module to transmit the message content to the client device; and
causing display of a notification that includes a presentation of the message content at the client device.

2. The system of claim 1, wherein the detecting the pairing of the pager module with the client device further comprises:
pairing the pager module to a plurality of client devices that include at least the client device; and wherein the record of the pairing of the pager module with the client device within the database includes a plurality of user identifiers associated with the plurality of client devices.

3. The system of claim 1, wherein the instructions cause the system to perform operations further comprising:
associating the pager identifier that identifies the pager module to the user identifier within a registry;
loading a device identifier associated with the user identifier into the pager module, in response to the associating the pager identifier to the user identifier within the registry; and
wherein the identifying the client device associated with the user identifier is based on the device identifier loaded into the pager module.

4. The system of claim 1, wherein the client device is a first client device, the message data further comprises a device identifier that identifies a second client device, and the instructions cause the system to perform operations further comprising:
receiving a response to the message data generated by the system from the first client device, the response including the device identifier that identifies the second client device;
identifying the second client device among a device registry at the system based on the device identifier; and
transmitting the response to the second client device.

5. The system of claim 1, wherein the message data further comprises an authentication request, and wherein the causing display of the notification at the client device includes causing display of the authentication request, and wherein the operations cause the system to perform operations further comprising:
receiving authentication data from the client device in response to the authentication request; and
causing display of the notification at the client device in response to the receiving the authentication data from the client device.

6. The system of claim 1, wherein the causing the pager module to transmit the message data to the client device communicatively coupled to the pager module includes forwarding the message data to the client device via Bluetooth.

7. The system of claim 1, wherein the message is based on a network protocol, and wherein the network protocol includes one or more of:
a Simple Network Paging Protocol (SNPP);
a Telelocator Alphanumeric Protocol (TAP);
Flexible Wide Area Paging Protocol (FLEX); and
Post Office Code Standardization Advisory Group (POCSAG).

8. A method comprising:
detecting a pairing of a pager module with a client device, the client device associated with a user identifier, and the pager module associated with a pager identifier;
updating a database to include a record of the pairing of the pager module with the client device, the record of the pairing including at least the pager identifier of the pager module and the user identifier of the client device;
receiving message data that includes at least message content, and the user identifier;
identifying the pager identifier of the pager module paired with the client device within the database based on the user identifier from the message data;
transmitting the message data to the pager module identified by the pager identifier;
causing the pager module to identify the client device communicatively coupled with the pager module based on the user identifier from the message data;
causing the pager module to transmit the message content to the client device; and
causing display of a notification that includes a presentation of the message content at the client device.

9. The method of claim 8, wherein the detecting the pairing of the pager module with the client device further comprises:
pairing the pager module to a plurality of client devices that include at least the client device; and
wherein the record of the pairing of the pager module with the client device within the database includes a plurality of user identifiers associated with the plurality of client devices.

10. The method of claim 8, wherein the method further comprises:
associating the pager identifier that identifies the pager module to the user identifier within a registry;
loading a device identifier associated with the user identifier into the pager module, in response to the associating the pager identifier to the user identifier within the registry; and
wherein the identifying the client device associated with the user identifier is based on the device identifier loaded into the pager module.

11. The method of claim 8, wherein the client device is a first client device, the message data further comprises a device identifier that identifies a second client device, and the method further comprises:
receiving a response to the message data generated by the system from the first client device, the response including the device identifier that identifies the second client device;
identifying the second client device among a device registry at the system based on the device identifier; and
transmitting the response to the second client device.

12. The method of claim 8, wherein the message data further comprises an authentication request, and wherein the causing display of the notification at the client device includes causing display of the authentication request, and wherein the method further comprises:
receiving authentication data from the client device in response to the authentication request; and
causing display of the notification at the client device in response to the receiving the authentication data from the client device.

13. The method of claim 8, wherein the causing the pager module to transmit the message data to the client device communicatively coupled to the pager module includes forwarding the message data to the client device via Bluetooth.

14. The method of claim 8, wherein the message is based on a network protocol, and wherein the network protocol includes one or more of:
a Simple Network Paging Protocol (SNPP);
a Telelocator Alphanumeric Protocol (TAP);
Flexible Wide Area Paging Protocol (FLEX); and
Post Office Code Standardization Advisory Group (POCSAG).

15. A non-transitory machine-readable storage medium comprising instructions that, when executed by one or more processors of a machine, cause the machine to perform operations comprising:

detecting a pairing of a pager module with a client device, the client device associated with a user identifier, and the pager module associated with a pager identifier;

updating a database to include a record of the pairing of the pager module with the client device, the record of the pairing including at least the pager identifier of the pager module and the user identifier of the client device;

receiving message data that includes at least message content, and the user identifier;

identifying the pager identifier of the pager module paired with the client device within the database based on the user identifier from the message data;

transmitting the message data to the pager module identified by the pager identifier;

causing the pager module to identify the client device communicatively coupled with the pager module based on the user identifier from the message data;

causing the pager module to transmit the message content to the client device; and causing display of a notification that includes a presentation of the message content at the client device.

16. The non-transitory machine-readable storage medium of claim 15, wherein the instructions cause the machine to perform operations further comprising:

pairing the pager module to a plurality of client devices that include at least the client device; and identifying, at the pager module, the client device from among the plurality of client devices based on the user identifier included among the message data.

17. The non-transitory machine-readable storage medium of claim 15, wherein the instructions cause the machine to perform operations further comprising:

associating the pager identifier that identifies the pager module to the user identifier within a registry;

loading a device identifier associated with the user identifier into the pager module, in response to the associating the pager identifier to the user identifier within the registry; and wherein the identifying the client device associated with the user identifier is based on the device identifier loaded into the pager module.

18. The non-transitory machine-readable storage medium of claim 15, wherein the client device is a first client device, the message data further comprises a device identifier that identifies a second client device, and the instructions cause the machine to perform operations further comprising:

receiving a response to the message data generated by the system from the first client device, the response including the device identifier that identifies the second client device;

identifying the second client device among a device registry at the system based on the device identifier; and transmitting the response to the second client device.

19. The non-transitory machine-readable storage medium of claim 15, wherein the message data further comprises an authentication request, and wherein the causing display of the notification at the client device includes causing display of the authentication request, and wherein the instructions cause the machine to perform operations further comprising:

receiving authentication data from the client device in response to the authentication request; and causing display of the notification at the client device in response to the receiving the authentication data from the client device.

20. The non-transitory machine-readable storage medium of claim 15, wherein the message is based on a network protocol, and wherein the network protocol includes one or more of:

a Simple Network Paging Protocol (SNPP);

a Telelocator Alphanumeric Protocol (TAP);

Flexible Wide Area Paging Protocol (FLEX); and

Post Office Code Standardization Advisory Group (POCSAG).

* * * * *